United States Patent
Smith et al.

(10) Patent No.: US 10,852,721 B1
(45) Date of Patent: Dec. 1, 2020

(54) AUTONOMOUS VEHICLE HYBRID SIMULATION TESTING

(71) Applicant: UATC, LLC, San Francisco, CA (US)

(72) Inventors: Jessica Elizabeth Smith, Pittsburgh, PA (US); Eric Michael Perko, Pittsburgh, PA (US); Michael Lee Phillips, Pittsburgh, PA (US); Colin Jeffrey Green, Pittsburgh, PA (US); Randy Warner, Allison Park, PA (US); Peter William Rander, Mars, PA (US)

(73) Assignee: UATC, LLC, San Francisco, CA (US)

(*) Notice: Subject to any disclaimer, the term of this patent is extended or adjusted under 35 U.S.C. 154(b) by 189 days.

(21) Appl. No.: 15/699,473

(22) Filed: Sep. 8, 2017

Related U.S. Application Data

(60) Provisional application No. 62/549,613, filed on Aug. 24, 2017.

(51) Int. Cl.
  *G05D 1/00* (2006.01)
  *G07C 5/08* (2006.01)
  *G05D 1/02* (2020.01)

(52) U.S. Cl.
  CPC ........... *G05D 1/0022* (2013.01); *G05D 1/021* (2013.01); *G07C 5/0808* (2013.01)

(58) Field of Classification Search
  CPC ..... G05D 1/0022; G05D 1/021; G07C 5/0808
  See application file for complete search history.

(56) References Cited

U.S. PATENT DOCUMENTS

| | | | |
|---|---|---|---|
| 8,190,295 B1* | 5/2012 | Garretson | G05D 1/0038 700/245 |
| 9,720,415 B2* | 8/2017 | Levinson | G01S 17/42 |
| 9,836,895 B1* | 12/2017 | Nygaard | G07C 5/0841 |
| 10,185,999 B1* | 1/2019 | Konrardy | G06Q 40/08 |
| 10,255,168 B2* | 4/2019 | Stefan | G06F 11/3604 |
| 2017/0123428 A1* | 5/2017 | Levinson | G05D 1/0214 |
| 2018/0136644 A1* | 5/2018 | Levinson | G01S 7/4972 |
| 2018/0341888 A1* | 11/2018 | Kislovskiy | G06Q 10/0635 |

* cited by examiner

*Primary Examiner* — Ramsey Refai
(74) *Attorney, Agent, or Firm* — Dority & Manning, PA

(57) ABSTRACT

Systems and methods for autonomous vehicle testing are provided. In one example embodiment, a computer implemented method includes obtaining, by a computing system including one or more computing devices, simulated perception data indicative of one or more simulated states of at least one simulated object within a surrounding environment of an autonomous vehicle. The computer-implemented method includes determining, by the computing system, a motion of the autonomous vehicle based at least in part on the simulated perception data. The computer-implemented method includes causing, by the computing system, the autonomous vehicle to travel in accordance with the determined motion of the autonomous vehicle through the surrounding environment of the autonomous vehicle.

19 Claims, 6 Drawing Sheets

AUTONOMOUS VEHICLE HYBRID SIMULATION TESTING

CROSS-REFERENCE TO RELATED APPLICATION

The present application is based on and claims priority to U.S. Provisional Application 62/549,613 having a filing date of Aug. 24, 2017, which is incorporated by reference herein.

FIELD

The present disclosure relates generally to controlling autonomous vehicles using simulated data to improve autonomous vehicle performance testing and evaluation.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One aspect of the present disclosure is directed to a computer-implemented method of autonomous vehicle testing. The method includes obtaining, by a computing system including one or more computing devices, simulated perception data indicative of one or more simulated states of at least one simulated object within a surrounding environment of an autonomous vehicle. The method includes determining, by the computing system, a motion of the autonomous vehicle based at least in part on the simulated perception data. The method includes causing, by the computing system, the autonomous vehicle to travel in accordance with the determined motion of the autonomous vehicle through the surrounding environment of the autonomous vehicle.

Another aspect of the present disclosure is directed to computing system for autonomous vehicle testing. The computing system includes one or more processors and one or more tangible, non-transitory, computer readable media that collectively store instructions that when executed by the one or more processors cause the computing system to perform operations. The operations include obtaining simulated perception data indicative of one or more simulated states of at least one simulated object within a surrounding environment of an autonomous vehicle. The operations include determining one or more predicted future locations of the at least one simulated object within the surrounding environment of the autonomous vehicle based at least in part on the simulated perception data. The operations include determining a motion plan for the autonomous vehicle based at least in part on the one or more predicted future locations of the at least one simulated object within the surrounding environment of the autonomous vehicle. The operations include causing the autonomous vehicle to travel in accordance with the motion plan through the surrounding environment of the autonomous vehicle.

Yet another aspect of the present disclosure is directed to a computer-implemented method. The method includes providing, by a computing system including one or more computing devices to an autonomous vehicle, simulated perception data indicative of a first simulated state of a simulated object within a surrounding environment of an autonomous vehicle. The method includes obtaining, by the computing system, vehicle data from the autonomous vehicle indicative of an action to be performed by the autonomous vehicle. The method includes determining, by the computing system based on the vehicle data, a second simulated state of the simulated object.

Other example aspects of the present disclosure are directed to systems, methods, vehicles, apparatuses, tangible, non-transitory computer-readable media, and memory devices for autonomous vehicle testing and configuring simulated objects.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
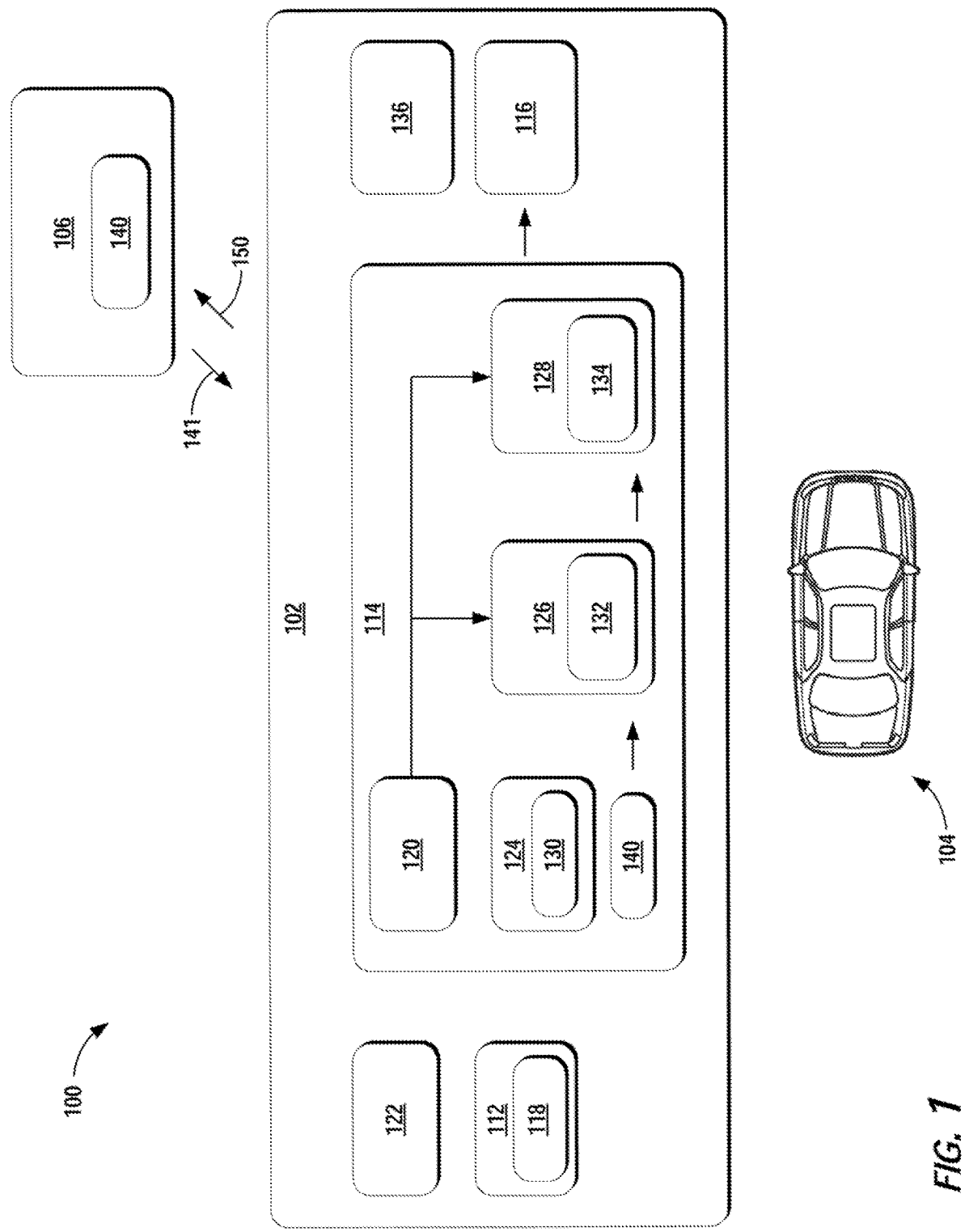
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling an autonomous vehicle using simulated perception data for improved vehicle testing and computational efficiency. To test the performance of an autonomous vehicle and its onboard computing systems, the autonomous vehicle can be operated within a testing environment such as, for example, a test track. Typically, one or more real objects (e.g., vehicles, bicyclists, pedestrians, lamp posts, trees, benches, curbs, etc.) can be placed within the testing environment to test the autonomous vehicle's ability to perceive these objects and appropriately plan its motion with respect to such objects. However, using a large number of real objects can be time intensive for the testing coordinators and require a significant amount of processing resources onboard the autonomous vehicle (e.g., to store and process sensor data to perceive these object(s)). The systems and methods of the present disclosure can preserve these resources by providing the autonomous vehicle with simulated perception data. Rather than using real objects, the simulated perception data can be indicative of one or more simulated object(s) within a surrounding environment of an autonomous vehicle. A simulated object is one that is not physically present in the surrounding environment but which the autonomous vehicle may perceive as such. The simulated perception data can define the locations, headings, classifications (e.g., vehicle vs. bicycle vs. pedestrian), and/or other characteristics of the simulated objects within the vehicle's surrounding environment (e.g., a testing environment). By way of example, instead of having a plurality of individuals walk around a test track to represent a crowd, the simulated perception data can be indicative of a plurality of simulated human pedestrians. The simulated perception data can be programmed so that when the autonomous vehicle processes the simulated perception data, the autonomous vehicle will perceive the simulated pedestrians as if they were real humans within the vehicle's surroundings. The autonomous vehicle can predict the motion of these simulated pedestrians and plan the motion of the vehicle accordingly. In this way, instead of collecting sensor data associated with the vehicle's surroundings and processing the sensor data to perceive real objects proximate to the vehicle, the autonomous vehicle can use the simulated perception data for vehicle performance testing and/or other scenarios. This can lead to increased testing configuration flexibility as well as significant savings in onboard memory and processing resources during testing.

More particularly, an autonomous vehicle can be a ground-based autonomous vehicle (e.g., car, truck, bus, etc.) or another type of vehicle (e.g., aerial vehicle) that can operate with minimal and/or no interaction from a human operator. The autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle.

The vehicle computing system can include one or more sensors (e.g., cameras, Light Detection and Ranging (LI-DAR), Radio Detection and Ranging (RADAR), etc.), an autonomy computing system (e.g., for determining autonomous navigation), one or more vehicle control systems (e.g., for controlling braking, steering, powertrain), etc. The sensor(s) can gather sensor data (e.g., image data, RADAR data, LIDAR data, etc.) associated with the surrounding environment of the vehicle. For example, the sensor data can include LIDAR point cloud(s) and/or other data associated with one or more real object(s) that are proximate to the autonomous vehicle (e.g., within a field of view of the sensor(s)). As used herein, the term "real" when used in reference to one or more objects refers to object (e.g., other vehicles, pedestrians, bicycles, etc.) that are actually/physically present within the surrounding environment of the autonomous vehicle. The sensor data can be indicative of characteristics (e.g., locations) associated with the object(s) at one or more times. The sensor(s) can provide such sensor data to the vehicle's autonomy computing system.

The autonomy computing system can be a computing system that includes various sub-systems that cooperate to perceive the surrounding environment of the autonomous vehicle and determine a motion plan for controlling the motion of the autonomous vehicle. For example, the autonomy computing system can include a perception system, a prediction system, and a motion planning system.

The perception system can be configured to perceive the surrounding environment of the autonomous vehicle. For instance, the perception system can process the sensor data from the sensor(s) to detect one or more real objects that are proximate to the autonomous vehicle as well as real perception data associated therewith. The real perception data can be indicative of one or more states of a real object that is within the surrounding environment of the autonomous vehicle, at one or more times. For example, the real perception data for each object can describe an estimate of the object's current and/or past location (also referred to as position), current and/or past speed/velocity, current and/or past acceleration, current and/or past heading, current and/or past orientation, size/footprint, class (e.g., vehicle class vs. pedestrian class vs. bicycle class), the uncertainties associated therewith, and/or other information about the state of the object.

The prediction system can be configured to predict a motion of the object(s) within the surrounding environment of the autonomous vehicle. For instance, the prediction system can create prediction data associated with one or more of the objects based at least in part on the perception data. The prediction data can be indicative of one or more predicted future locations of each respective object. The prediction data can indicate a predicted path associated with each object. The predicted path can be indicative of a trajectory along which the respective object is predicted to travel over time (and/or the speed at which the object is predicted to travel along the predicted path).

The autonomy computing system can determine a motion plan for the autonomous vehicle based at least in part on the prediction data and/or other data such as a vehicle route for which the autonomous vehicle is to follow. The motion plan can include vehicle actions with respect to the objects proximate to the vehicle as well as the predicted movements. For instance, the autonomy computing system can implement an optimization algorithm that considers cost data associated with a vehicle action as well as other objective functions (e.g., cost functions based on speed limits, traffic lights, etc.), if any, to determine optimized variables that make up the motion plan. The vehicle actions can be determined to control a motion of the autonomous vehicle, for example, without user input to the autonomous vehicle. The motion plan can include these vehicle actions to be performed by the autonomous vehicle, a planned trajectory, a vehicle speed, a vehicle acceleration, etc.

To test the autonomous vehicle and the vehicle computing system, the autonomous vehicle can be operated within a testing environment. A testing environment refers to a surrounding environment of an autonomous vehicle used for testing one or more functions of the autonomous vehicle. The testing environment can include, for example, a closed course testing environment (e.g., a ground test track, aerial test track, etc.) and/or another testing environment. The testing environment can include travel ways (e.g., roads, flight paths, etc.) for the autonomous vehicle to travel.

Testing coordinators can configure the testing environment to test the performance of the autonomous vehicle. For example, the testing can be configured to test the autonomous vehicle's ability to predict the motion of certain objects within the vehicle's surrounding environment, generate vehicle motion plans, implement vehicle motion plans, and/or other autonomous operations.

To help improve the flexibility and efficiency of the vehicle testing, the autonomous vehicle can utilize simulated perception data. For instance, the perception system of the autonomous vehicle can be disabled (at least partially) from processing sensor data to generate perception data, as described herein. Instead, a remote computing device can provide simulated perception data to the autonomous vehicle, which can store the simulated perception data in an accessible memory onboard the autonomous vehicle. The simulated perception data can be included in a program file (e.g., "simfile") in one or more formats (e.g., a binary format, etc.).

The simulated perception data can define one or more simulated objects within the surrounding environment of the autonomous vehicle (e.g., within the testing environment). A simulated object refers to an object that is not actually/physically present within the surrounding environment. The simulated object(s) can include a simulated vehicle, bicyclist, pedestrian, tree, bench, sign, obstacle, and/or any other object. In some implementations, a simulated object can be static (e.g., a parked vehicle). In some implementations, a simulated object can move (e.g., a walking pedestrian). For example, the simulated perception data can be indicative of an initial position of a simulated object and a trajectory along which the simulated object is to travel within the surrounding environment. The simulated perception data can be indicative of the speed at which the simulated object is to travel. The initial position and/or trajectory can be defined by coordinate points within the Cartesian coordinate system of the vehicle's surrounding environment (e.g., testing environment). In some implementations, the simulated object can be programmed to be "smart" such that the simulated perception data can define a waypoint and the simulated object can travel to the waypoint without a defined trajectory (e.g., based on other algorithms/functions to simulate motion of the specific type of object).

The simulated perception data can be indicative of one or more simulated states (e.g., at one or more times) of a simulated object within the surrounding environment of the autonomous vehicle. For example, the simulated perception data can describe at least one of the following for a simulated object: one or more location(s) (also referred to as position) as described herein, a speed/velocity, an acceleration, a heading, an orientation, a size/footprint, a class (e.g., vehicle class vs. pedestrian class vs. bicycle class vs. other object type class), uncertainties associated therewith, and/or other state information.

The simulated perception data can be created in a variety of manners. In some implementations, the simulated perception data (e.g., the simfile associated therewith) can be generated based at least in part on user input. For example, a testing coordinator can provide user input to a user interface to define a simulated object as well as one or more simulated states of the simulated object. In some implementations, a computing system can automatically generate the simulated perception data (e.g., the simfile associated therewith). For instance, the computing system can be configured to generate simulated perception data for a specific test or set of tests for an autonomous vehicle. By way of example, the computing system can be configured to generate a first set of simulated perception data that is indicative of a large crowd of pedestrians for a first test (e.g., testing for a highly populated urban area). Additionally, or alternatively, the computing system can be configured to generate a second set of simulated perception data that is indicative of a large number of other vehicles for a second test (e.g., testing for a high traffic scenario). As described herein, the simulated perception data can be provided to the autonomous vehicle for storage within the vehicle's onboard memory.

In some implementations, a simulated object can be reactive to the other objects (e.g., real and/or simulated) in the surrounding environment and/or the autonomous vehicle. For example, the simulated object can be configured to perceive the other object(s) in the surrounding environment and react accordingly (e.g., avoid a collision). To do so, the simulated object can be given knowledge of the other location(s) and/or trajectories of the other objects (e.g., real and/or simulated) in the surrounding environment. Such knowledge can be based at least in part on the simulated perception data and/or other data obtained onboard the autonomous vehicle. Additionally, or alternatively, a simulated object can be configured to perceive the autonomous vehicle and react accordingly (e.g., to avoid collision). For example, the simulated object can be given knowledge of the autonomous vehicle's planned motion. Such knowledge can be based at least in part on the motion plan generated by the motion planning system of the autonomous vehicle.

The simulated objects can be associated with various levels of reactivity. For instance, each simulated object may be associated with different reaction logic. The reaction logic (e.g., rule-based, machine-learning-based, etc.) can define how the respective simulated object reacts to the motion of other object(s) and/or the autonomous vehicle within the surrounding environment. For instance, a simulated object can be associated with a higher level of reactivity such that the simulated object is more careful/cautious of the other object(s) and/or the autonomous vehicle. The logic can be programmed such that the simulated states of the simulated object are selected to carefully avoid a collision with the other object(s) and/or the autonomous vehicle. In some implementations, a simulated object can be associated with a lower level of reactivity such that the simulated object is reflective of an object that is less careful/cautious with respect to the other object(s) and/or the autonomous vehicle. The logic can be programmed such that the simulated states of the simulated object are selected without priority in avoiding a collision with autonomous vehicle and/or another object. Additionally, or alternatively, the logic can be programmed such that the simulated states of the simulated object are selected in order to attempt to cause a collision with the autonomous vehicle and/or another object.

In some implementations, the simulated perception data can be indicative of the data inputted into the perception system. For instance, one or more of the sensors of the autonomous vehicle can be disabled such that the vehicle is not obtaining, obtaining less, and/or not storing sensor data. The simulated perception data can include simulated sensor data. The simulated sensor data can be indicative of locations associated with one or more simulated object(s) within the surrounding environment of the vehicle at one or more times. For example, the simulated sensor data can include simulated point cloud(s) and/or other data associated with one or more simulated objects. The simulated sensor data can be configured in a manner that is similar to the raw and/or processed sensor data that would be obtained via normal operation of the vehicle's sensors. The perception system of the autonomous vehicle can process the simulated sensor data as if it was real sensor data (as described herein) to perceive the surrounding environment of the autonomous vehicle and the object(s) included therein. The perception system can obtain perception data based at least in part on the simulated sensor data. Moreover, the prediction system can predict the motion (e.g., trajectories) of the object(s) perceived based at least in part on the simulated sensor data and the motion planning system can plan the motion of the vehicle (e.g., generate a motion plan) accordingly.

The autonomous vehicle can implement the simulated perception data. For instance, the vehicle's autonomy computing system can access the simulated perception data from an accessible memory onboard the autonomous vehicle. The autonomy computing system can utilize the simulated perception data as it would for real perception data to help autonomously operate the vehicle. For instance, the vehicle's prediction system can generate prediction data based at least in part on the simulated perception data. By way of example, the prediction system can predict one or more predicted future locations of a simulated object within the surrounding environment of the autonomous vehicle based at least in part on the simulated perception data (e.g., the simulated state(s) of the simulated object). Furthermore, the vehicle's motion planning system can plan the motion of the autonomous vehicle based at least in part on the simulated perception data. For example, the motion planning system can determine a motion plan for the autonomous vehicle based at least in part on the one or more predicted future locations of the simulated object(s) within the surrounding environment of the autonomous vehicle (e.g., predicted movements based on the simulated perception data) and/or the simulated perception data (e.g., indicating the location of a simulated object). The autonomy computing system can send one or more control signals to cause the autonomous vehicle to travel in accordance with this motion plan, through the vehicle's surrounding environment (e.g., testing environment).

The autonomous vehicle can provide feedback data associated with its operations based on the simulated perception data. For example, during and/or after testing, the vehicle computing system can provide feedback data associated with the autonomous vehicle to one or more remote computing devices which are remote from the autonomous vehicle. The feedback data can be descriptive of the operations of the systems onboard the autonomous vehicle (e.g., the autonomy system and its sub-systems). For example, the feedback data can include one or more predicted future locations of a simulated object (as determined from the simulated perception data), motion planning data, and/or data messages associated with the system(s) onboard the autonomous vehicle. The remote computing device(s) can obtain the feedback data, such as, for example, over one or more networks. The remote computing device(s) can perform one or more evaluation and/or performance analyses on the feedback data to determine the performance of the autonomous vehicle and/or its systems (e.g., within the testing environment).

In some implementations, the autonomous vehicle can implement a combination of simulated perception data and real perception data. For example, a testing environment can be configured to include one or more real objects (e.g., real vehicle(s), real bicycle(s), tree(s), bench(es), pedestrian(s), etc.). The perception system of the autonomous vehicle can be enabled (at least partially) to process sensor data indicative of the real objects in order to perceive these real objects within the vehicle's surrounding environment (e.g., testing environment). The autonomous vehicle can implemented simulated perception data indicative of one or more simulated objects to supplement the perception data indicative of the real objects within the vehicle's surrounding environment. By way of example, the test track can include a road on which the autonomous vehicle is to travel. The test coordinators can place a real parked vehicle on one side of a road as well as a series of trees. Additionally, the autonomous vehicle can be provided with simulated perception data that is indicative of a plurality of vehicles travelling on the other side of the road to simulate oncoming traffic in an adjacent travel lane. The autonomous vehicle can use its perception system to perceive the real parked vehicle and the trees. The autonomous vehicle can utilize the simulated perception data to perceive the simulated oncoming traffic. The autonomous vehicle can plan its motion accordingly to avoid the real parked vehicle and the real trees, without traveling into the adjacent travel lane that has oncoming traffic. In this way, the simulated perception data can supplement the real conditions within the testing environment with simulated testing conditions.

Although the systems and methods are described herein with respect to a testing environment, the present disclosure can be implemented in a variety of additional, or alternate, environments. An autonomous vehicle can be provided with simulated perception data that is indicative of simulated objects within a surrounding environment that is not a testing environment. By way of example, an autonomous vehicle can be deployed within a geographic area that includes a plurality of unmarked intersections such as, for example, a new neighborhood development under construction. Given the stage of construction, the unmarked intersection may not yet have stop signs placed within the neighborhood development. The autonomous vehicle can obtain simulated perception data that includes simulated stop signs positioned at the intersections. The autonomous vehicle can plan its motion with respect to such simulated stop signs as a further safety precaution when operating in such a geographic area.

The systems and methods described herein provide a number of technical effects and benefits. For instance, the present disclosure provides systems and methods for improved testing of autonomous vehicles by providing simulated testing conditions into a real-world platform (e.g., the autonomous vehicle). In particular, the use of simulated perception data can increase testing efficiency via improved flexibility, reproducibility, complex scenario implementation, and systems isolation testing.

The systems and methods of the present disclosure can improve the flexibility of autonomous vehicle testing. For instance, the use of simulated perception data can allow the testing coordinators to define specific testing conditions (e.g., the presence of simulated objects) without having to physically manipulate the testing environment (e.g., set-up, tear-down) or to locate additional testing resources (e.g., additional pedestrians). This can lead to less vehicle downtime and allow for an increased number of test runs over a particular time period. Ultimately, this can produce a greater amount of autonomous vehicle test data logs—helping to better identify vehicle performance and tests of interest. Using the simulated perception data to identify tests of interest can help test coordinators more quickly iterate to useful real-world logs for the training of the vehicle's autonomy system. Moreover, the use of simulated perception data can lead to the use of less real objects within a testing environment, which can decrease testing costs as well as potential damage to the autonomous vehicle. For example, the systems and methods described herein can allow for the testing of realistic pedestrian encounters without risk to human test participants as well as testing of realistic encounters with other objects without risk to property damage (e.g., other vehicles, the autonomous vehicle being tested, etc.). Moreover, test validation can be easier when vehicle behavior in a test varies from that expected of an autonomous vehicle deployed in the real world (e.g., better A-B comparison of real-world versus the perfect trajectory follower).

The systems and methods of the present disclosure improve the reproducibility of autonomous vehicle testing. For example, once the simulated perception data (e.g., an associated simfile) is created, it can be used over and over again to create a more consistent reproducible environment for testing. This can allow for reproducible inputs for better testing conditions such as, for example, more deterministic reproducible perception inputs (e.g., simulated object behavior with real-world physics). Moreover, the simulated perception data can be adjusted while the autonomous vehicle is running in a test environment (e.g., small adjustments to existing tests) to improve the ability of ad-hoc testing. Moreover, the simulated perception data can be configured to reproduce a previous interaction faced by the autonomous vehicle. For example, in the event that the feedback data indicates an interesting scenario for the autonomous vehicle (e.g., a new object-vehicle interaction), simulated perception data can be generated to cause a similar scenario to occur in a future test. This can allow for easier data acquisition and/or performance analysis of such a scenario of interest.

The systems and methods improve the ability to implement complex testing conditions for an autonomous vehicle. For example, many objects interacting in a testing environment (e.g., test track) can be complicated and often dangerous to produce. The systems and methods of the present disclosure allow for the generation of very detailed, complex scenarios that can be more easily tested (e.g., via the use of the simulated perception data). Moreover, the simulated perception data can allow for easier testing of occlusion of a vehicle sensor by allowing for a more accurate placement of simulated objects (e.g., by defined coordinates) within the coordinate system of the surrounding environment.

The systems and methods of the present disclosure also provide an improvement to systems isolation testing. More particularly, the systems and methods provide the ability to isolate object motion prediction and vehicle motion planning problems from perception problems. For example, the motion planning and prediction systems on the autonomous vehicle can be isolated from possible noise from the perception system. This allows those systems to be tested for A-B comparisons in software changes that should only impact those systems. Moreover, the ability to isolate motion planning and prediction from the rest of the autonomy system is useful for debugging consistent tests across vehicle command changes. In addition, it can be much easier to reproduce the exact perception inputs (timing, speed, perceived parameters, etc.) when utilizing simulated perception data (e.g., running a simfile) versus a track test relying solely on real objects. Moreover, isolation of deterministic inputs to the system can assist in validating failure points in the software.

The systems and methods of the present disclosure also provide an improvement to vehicle computing technology, such as autonomous vehicle computing technology. For instance, the systems and methods reduce the computational resources needed to perform vehicle operations in a testing environment or elsewhere. In particular, a computing system (e.g., vehicle computing system) can obtain simulated perception data indicative of one or more simulated states of at least one simulated object within a surrounding environment of an autonomous vehicle. The computing system can determine a motion of the autonomous vehicle based at least in part on the simulated perception data. The computing system can cause the autonomous vehicle to travel in accordance with the determined motion of the autonomous vehicle through the surrounding environment of the autonomous vehicle. By using the simulated perception data, the vehicle computing system can save significant memory and processing resources needed for sensor data processing and real object perception. Moreover, the simulated perception data can allow the vehicle computing system to be tested without adding additional hardware to the autonomous vehicle (e.g., additional sensors to capture certain object characteristics). In this way, the vehicle computing system is not confined to the limitations presented by the existing hardware on the autonomous vehicle (e.g., the specific sensor types), nor do all the onboard sensors need to be operational for vehicle testing. In some implementations, use of the simulated perception data can allow one or more sensors (e.g., LIDAR system) to be omitted from the autonomous vehicle during testing, saving power resources and cost.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and a simulation computing system 106 that is remote from the vehicle 104.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human driver. In some implementations, a human operator can be included in the vehicle 104. In some implementations, a human operator can be omitted from the vehicle 104 (and/or also omitted from remote control of the vehicle 104).

The vehicle 104 can be configured to operate in a plurality of operating modes. The vehicle 104 can be configured to operate in a fully autonomous (e.g., self-driving) operating mode in which the vehicle 104 can drive and navigate with no input from a user present in the vehicle 104. The vehicle 104 can be configured to operate in a semi-autonomous operating mode in which the vehicle 104 can operate with some input from a user present in the vehicle 104. The vehicle 104 can enter into a manual operating mode in which the vehicle 104 is fully controllable by a user (e.g., human driver) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the operator of the vehicle 104.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for autonomous vehicle testing.

As shown in FIG. 1, the vehicle 104 can include one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more real objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. Real object(s) can include objects that are actually/physically present within the surrounding environment of the vehicle 104. The real objects can include, for example, pedestrians, vehicles, bicycles, and/or other objects. The real object(s) can be located in front of, to the rear of, and/or to the side of the vehicle 104. The sensor data 118 can be indicative of locations associated with the real object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. When within a testing environment (e.g., a test track), the map data 120 can provide a variety of information associated with the testing environment (e.g., with reference to the coordinate system of the testing environment). For example, the map data 120 can provide information regarding: the identity and location of different travel ways, travel way segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment (e.g., the testing environment) and its relationship thereto.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the simulation computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment (e.g., to transpose its location within the testing environment).

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more real objects that are proximate to the vehicle 104 based at least in part on the sensor data 118 and/or the map data 120. When enabled, the perception system 124 can process the sensor data 118 from the sensor(s) to detect one or more real objects within the surrounding environment of the vehicle 104 as well as real perception data 130 associated therewith. The real perception data 130 can be indicative of one or more states of a real object that is within the surrounding environment of the vehicle 104, at one or more times. For example, the real perception data 130 for each object can describe an estimate of the object's current and/or past location (also referred to as position), current and/or past speed/velocity, current and/or past acceleration, current and/or past heading, current and/or past orientation, size/footprint, bounding shape, class (e.g., vehicle class vs. pedestrian class vs. bicycle class), the uncertainties associated therewith, and/or other state information. When enabled to do so, the perception system 124 can provide the real perception data 130 to the prediction system 126 (e.g., for predicting the movement of an object).

The prediction system 126 can create prediction data 132 associated with each of the respective one or more objects (e.g., real or simulated) within the surrounding environment of the vehicle 104. The prediction data 132 can be indicative of one or more predicted future locations of each respective object. The prediction data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction system 126 can provide the prediction data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104.

The motion planning system 128 can provide the motion plan 134 with data indicative of the vehicle actions, a planned trajectory, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined motion plan 134 into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the motion plan 134.

The vehicle 104 can include a communications system 136 configured to allow the vehicle computing system 102 (and its computing device(s)) to communicate with other computing devices. The vehicle computing system 102 can use the communications system 136 to communicate with the simulation computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can include any suitable components for interfacing with one or more network(s), including, for example, transmitters, receivers, ports, controllers, antennas, and/or other suitable components that can help facilitate communication (e.g., with the simulation computing system 106).

The simulation computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104 (e.g., a laptop, desktop, tablet, etc.). In some implementations, one or more of the computing devices of the simulation computing system 106 can be onboard the vehicle 104. The computing device(s) of the simulation computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the simulation computing system 106 (e.g., the one or more processors, etc.) to perform operations and functions, such as for generating simulated perception data 140, configuring simulated objects (and their associated logic), provide the simulated perception data to the vehicle computing system 102, etc. as described herein.

To test the vehicle 104 and the vehicle computing system 102 (and its component systems), the vehicle 104 can be operated within a testing environment. The testing environment can include, for example, a closed course testing environment (e.g., a ground test track, aerial test track, etc.) and/or another testing environment. The testing environment can include one or more travel ways (e.g., roadways, flight paths, etc.) for the vehicle 104 to travel. In some implementations, human testing coordinators can configure the testing environment to test the performance of the vehicle 104. For example, the testing can be configured to test the vehicle's ability to predict the motion of certain objects within the vehicle's surrounding environment (e.g., testing environment), generate vehicle motion plans, implement vehicle motion plans, and/or other autonomous operations.

To save considerable computational resources for testing, in some implementations, the vehicle computing system 102 can be disabled from performing its typical perception system actions. For example, in some implementations, the sensors 112 can be disabled from obtaining sensor data 118 associated with the surrounding environment of the vehicle 104 such that the perception system 124 can be prevented from processing such data to perceive the surrounding environment. In some implementations, the sensors 112 can obtain sensor data 118 only for the purpose of understanding the position of the vehicle 104 within the surrounding environment (e.g., transposing the position of the vehicle 104 into a coordinate system of its surrounding environment). Additionally, or alternatively, the perception system 124 can be disabled from perceiving the surrounding environment of the vehicle 104 based on the sensor data 118 obtained via the one or more sensors 112.

The vehicle computing system 102 can obtain simulated perception data 140 indicative of one or more simulated states of at least one simulated object within a surrounding environment of a vehicle 104. The surrounding environment of the vehicle 104 can be a testing environment. For instance, the vehicle computing system 102 can obtain the simulated perception data 140 from one or more remote computing devices (e.g., the simulation computing system 106). The vehicle computing system 102 can store the simulated perception data 140 in an accessible memory onboard the vehicle 104. The simulated perception data can be included in a program file (e.g., "simfile") in one or more formats (e.g., a binary format, etc.).

The program file can run simulation as perception on the vehicle 104 with configurable blueprints and can be provided to the vehicle from the simulation computing system 106. The program file including the simulated perception data 140 can include a variety of blueprints that can be utilized by the vehicle computing system 102 for implementation of the simulated perception data 140. For example, the program file can include a first blueprint that can launch the simulated perception data 140 with all the necessary configurations for other autonomy tasks (e.g., of the autonomy computing system 114). The simulated perception data 140 can include a second blueprint that can run on a bench and includes configurations to run certain tasks that allow the vehicle to move around a simulated map that has been loaded to the bench. The simulated perception data 140 can include a third blueprint designed to contain all the necessary configurations for running simulated data on the vehicle 104. Any customizations that a certain platform requires can be located in their respective blueprints.

The simulated perception data 140 can define one or more simulated objects within the surrounding environment of the vehicle 104 (e.g., within the testing environment). A simulated object is an object that is not actually/physically present within the surrounding environment. The simulated object(s) can include a simulated vehicle, bicyclist, pedestrian, tree, bench, sign (e.g., stop sign), obstacle, and/or any other object. In some implementations, a simulated object can be static (e.g., a simulated parked vehicle).

In some implementations, a simulated object can be programmed to move (e.g., a simulated walking pedestrian). For example, the simulated perception data 140 can be indicative of an initial position of a simulated object and a trajectory along which the simulated object is to travel within the surrounding environment. The initial position and/or trajectory can be defined by coordinate points within the Cartesian coordinate system of the vehicle's surrounding environment (e.g., testing environment).

The simulated perception data 140 can be indicative of one or more simulated states (e.g., at one or more times) of at least one simulated object within the surrounding environment of the vehicle 104. The one or more simulated states of the at least one simulated object can be indicative of at least one of: one or more locations (also referred to as position) of the at least one simulated object within the surrounding environment of the vehicle 104, a classification of the at least one simulated object (e.g., vehicle class vs. pedestrian class vs. bicycle class vs. other object type class), a speed (and/or velocity) of the at least one simulated object, or a heading of the at least one simulated object. Additionally, or alternatively, the one or more simulated states can be indicative of at least one of an acceleration of the at least one simulated object, an orientation of the at least one simulated object, a size/footprint, a bounding shape associated with the at least one simulated object, uncertainties associated therewith, and/or other state information.

The simulated perception data 140 can be created in a variety of manners. In some implementations, the simulated perception data 140 (e.g., the simfile associated therewith) can be generated based at least in part on user input. For example, a testing coordinator can provide user input to a user interface to define a simulated object as well as one or more simulated states of the simulated object. The user interface can be displayed via a display device (e.g., screen) associated with the simulation computing system 106. In some implementations, the simulation computing system 106 can automatically generate the simulated perception data 140 (e.g., the simfile associated therewith). For instance, the simulation computing system 106 can be configured to generate the simulated perception data 140 for a specific test or set of tests for a vehicle 104. By way of example, the simulation computing system 106 can be configured to generate a first set of simulated perception data that is indicative of a large crowd of simulated pedestrians for a first test (e.g., testing for a highly populated urban area). In another example, the simulation computing system 106 can be configured to generate a second set of simulated perception data that is indicative of a large number of simulated vehicles for a second test (e.g., testing for a high traffic scenario).

In some implementations, the simulated object can be programmed to be "smart". For example, the simulated perception data 140 can define a waypoint and the simulated object can travel to the waypoint without a defined trajectory (e.g., based on other algorithms/functions to simulate motion of the specific type of object). In some implementations, the simulated perception data 140 can define the speed at which the simulated object is to travel.

In some implementations, a simulated object can be reactive to the other objects (e.g., real and/or simulated) in the surrounding environment and/or the vehicle 104. For example, the simulated perception data 140 can indicate that at least one simulated object within the surrounding environment of the vehicle 104 is configured to be reactive to the motion of the vehicle 104. As further described herein, a reactive simulated object can be configured to perceive the other object(s) in the surrounding environment and react accordingly (e.g., to avoid a collision). To do so, the simulated object can be programmed to have knowledge of the other location(s) and/or trajectories of the other objects (e.g., real and/or simulated) in the surrounding environment. Such knowledge can be based at least in part on the simulated perception data 140 and/or other data obtained onboard the vehicle 104. Additionally, or alternatively, a simulated object can be configured to perceive the vehicle 104 and react accordingly (e.g., to avoid collision). For example, the simulated object can be programmed to have knowledge of the vehicle's planned motion. Such knowledge can be based at least in part on the motion plan 134 generated by the motion planning system 128 of the vehicle 104.

The simulation computing system 106 can be configured to coordinate the reaction of a simulated object to its surroundings. For instance, the simulation computing system 106 can be programmed to have logic such that given a motion plan 134 of the vehicle 104; one or more simulated object(s) would react based on the associated logic. The simulation computing system 106 can provide, to a vehicle 104, simulated perception data 140 indicative of a first simulated state of a simulated object within a surrounding environment of the vehicle 104. The first simulated state of the simulated object can be indicative of a first location of the simulated object (e.g., at a first time), a first heading, etc. The simulation computing system 106 can obtain vehicle data 141 from the vehicle 104 (e.g., the vehicle computing system 102) indicative of an action to be performed by the vehicle 104. The vehicle data 141 can include, for example, data associated with a motion plan 134 of the vehicle 104. The simulation computing system 106 can process the vehicle data 141 to determine what actions (e.g., motion trajectories, lane changes, turns, nudges, etc.) the vehicle 104 is planning to perform.

The simulation computing system 106 can adjust the state of the simulated object such that the simulated object reacts to the motion of the vehicle 104. For instance, the simulation computing system 106 can determine a second simulated state of the simulated object based at least in part on the vehicle data 141. The second simulated state of the simulate object can be indicative of a second location, heading, etc. of the simulate object at a second time. The second location can be different from the first simulated location. The simulation computing system 106 can determine the second simulated state of the simulated object, based on the motion plan 134, such that the simulated object moves within the surrounding environment of the vehicle 104 in a particular manner as defined by the associated logic (e.g., to avoid a collision with the vehicle 104 and its planned motion path).

The simulated objects can be associated with various levels of reactivity. For instance, each simulated object may be associated with different reaction logic. The reaction logic (e.g., rule-based, machine-learning-based, etc.) can define how the respective simulated object reacts to the motion of other object(s) and/or the vehicle 104 within the surrounding environment. For instance, a simulated object can be associated with a higher level of reactivity such that the simulated object is more careful/cautious of the other object(s) and/or the vehicle 104. The logic can be programmed such that the simulated states of the simulated object are selected to carefully avoid a collision with the other object(s) and/or the vehicle 104. In some implementations, a simulated object can be associated with a lower level of reactivity such that the simulated object is reflective of an object that is less careful/cautious with respect to the other object(s) and/or the vehicle 104. The logic can be programmed such that the simulated states of the simulated object are selected without priority in avoiding a collision with another vehicle 104 and/or another object. Additionally, or alternatively, the logic can be programmed such that the simulated states of the simulated object are selected in order to attempt to cause a collision with the vehicle 104 and/or another object.

A simulated object can also be reactive to the other objects within its surroundings. For instance, the simulation computing system 106 can obtain data indicative of the states (e.g., real or simulated) of one or more other objects (e.g., real or simulated) within the surrounding environment of the vehicle 104. Such data can be indicative of the location, speed, heading, etc. of one or more objects at one or more times. The simulation computing system 106 can determine one or more future simulated states of a simulated object based at least in part on the states of the other object(s) in the surrounding environment. The future simulated state(s) can be selected to reflect an object that is more careless (e.g., more likely to collide with another object) and/or an object that is more careful (e.g., less likely to collide with another object). This can allow the states of a simulated object to account for one or more other objects proximate to that simulated object.

In some implementations, the simulated computing system 106 can determine the simulated state(s) of a simulated object based at least in part on both the planned motion of the vehicle 104 and the state(s) of the other object(s) within the surrounding environment. For instance, the simulated computing system 106 can obtain vehicle data 141 indicative of an action to be performed by the vehicle 104 and data indicative of state(s) of one or more other objects. The simulated computing system 106 can determine a second state of a simulated object based at least in part on the vehicle data 141 and the data indicative of state(s) of one or more other objects. In some implementations, the simulation computing system can utilize a weighed approached to determine the second state of the simulated object. For example, the simulation computing system 106 can apply a first weight to the vehicle data 141 and a second weight to the data indicative of the state(s) of the other objects. The first weight can be different from the second weight. For instance, in the event that the simulated object is to be more careful with respect to the vehicle 104 (than the other object(s)) the first weight can be greater than the second weight. In the event that the simulated object is to be more careful with respect to the other object(s) (than the vehicle 104) the first weight can be greater than the second weight. In the event that the simulated object is to be equally careful, the first and second weight can be the same. This can allow the simulated object to be reactive to both the vehicle and the other objects, in a customized manner.

In some implementations, the simulated perception data can be indicative of the data inputted into the perception system 124. For instance, one or more of the sensors 112 of the vehicle 104 can be disabled such that the vehicle 104 is not obtaining, obtaining less, and/or not storing sensor data 118. In some implementations, vehicle transposition of its position may still be enabled. The simulated perception data 140 can include simulated sensor data. The simulated sensor data can be indicative of locations associated with one or more simulated object(s) within the surrounding environment of the vehicle 104 at one or more times. For example, the simulated sensor data can include simulated point cloud(s) and/or other data associated with one or more simulated objects. The simulated sensor data can be configured in a manner that is similar to the raw and/or processed sensor data 118 that would be obtained via typical operation of the sensor(s) 112. The simulation computing system 106 can provide the simulated sensor data to the vehicle computing system 102.

The perception system 124 process the simulated sensor data as if it was real sensor data (as described herein) to perceive the surrounding environment of the vehicle 104 and the object(s) included therein. For instance, the perception system 124 can process the simulated sensor data to estimate a simulated object's current and/or past location, current and/or past speed/velocity, current and/or past acceleration, current and/or past heading, current and/or past orientation, size/footprint, bounding shape, class (e.g., vehicle class vs. pedestrian class vs. bicycle class), the uncertainties associated therewith, and/or other state information. The perception system 124 can provide the perception data based at least in part on the simulated sensor data to the prediction system 126.

The prediction system 126 can predict the motion (e.g., trajectories) of the object(s) that are perceived based at least in part on the simulated sensor data. The prediction system 126 can create prediction data associated with each of the respective one or more objects within the surrounding environment of the vehicle 104 that were detected using the simulated sensor data. The prediction data can be indicative of one or more predicted future locations of each of these respective objects. For example, the prediction data can be indicative of a predicted path (e.g., predicted trajectory) of at least one object within the surrounding environment of the vehicle 104. The prediction system 126 can provide such prediction data 132 to the motion planning system 128.

The motion planning system 128 can determine a motion plan 134 for the vehicle 104 based at least in part on the predicted data (generated using the perception data based at least in part on the simulated sensor data). The motion plan 134 can include vehicle actions with respect to the objects proximate to the vehicle 104 as well as the predicted movements, in a manner similar to that described herein. In this way, the motion of the vehicle 104 can be based at least in part on the simulated sensor data.

Figure 2:
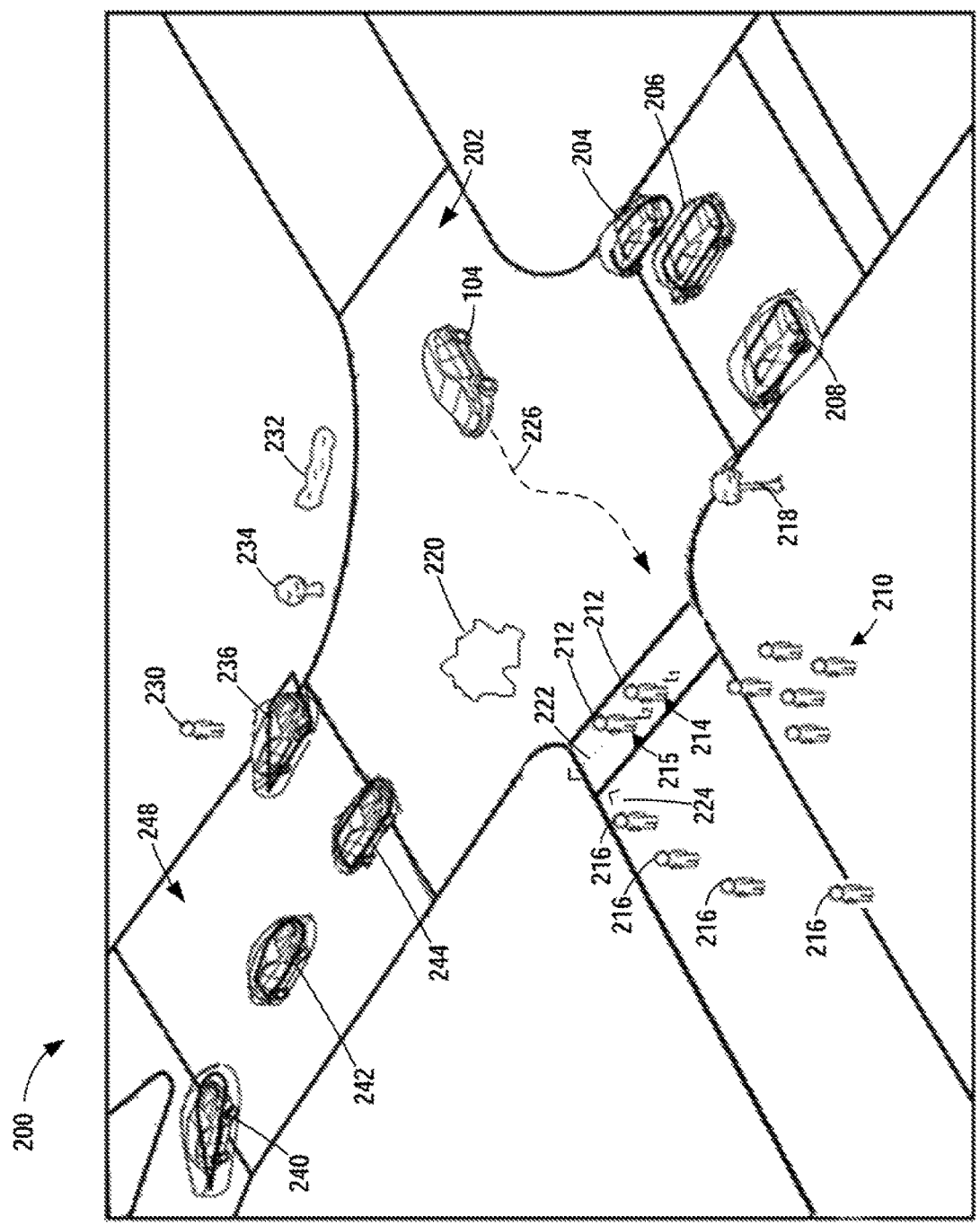
FIG. 2 depicts an example surrounding environment of an autonomous vehicle according to example embodiments of the present disclosure.

FIG. 2 depicts an example surrounding environment 200 of the vehicle 104 according to example embodiments of the present disclosure. The surrounding environment 200 can be a testing environment used for testing one or more functions of the vehicle 104. This can include, for example, a closed course test track that is not available to the public. The surrounding environment 200 can include one or more travel ways 202, 248 on which the vehicle 104 can travel. For example, as shown, the surrounding environment 200 can include an intersection for testing the operations and functions of the vehicle 104 in such a scenario.

The surrounding environment 200 can include one or a plurality of simulated objects defined by the simulated perception data 140. For example, the simulated perception data 140 can be indicative of a first simulated object 204 (e.g., a first simulated vehicle), a second simulated object 206 (e.g., a second simulated vehicle), and a third simulated object 208 (e.g., a third simulated vehicle). The simulated perception data 140 can define the location(s) associated with each of these objects. As described herein, the location(s) can be defined based at least in part on a coordinate system of the specific surrounding environment 200. The simulated perception data 140 can also identify the classification of the respective simulated object 204-208 (e.g., vehicle class) and a bounding shape associated with the simulated object, as shown. One or more of these simulated objects 202-208 can be static (e.g., remain at a single location) or be configured to move within the surrounding environment 200, as described herein.

The surrounding environment 200 can include one or a plurality of other simulated objects defined by the simulated perception data 140. For example, the simulated perception data 140 can be indicative of a set of simulated objects 210 to simulate a crowd of pedestrians. At least a subset of the set of simulated objects 210 can be static (e.g., to simulate a waiting crowd) and/or designated to move within the surrounding environment 200. Additionally, or alternatively, the simulated perception data 140 can be indicative of a fourth simulated object 212 (e.g., a pedestrian traveling within a crosswalk). The simulated perception data 140 can be indicative of a plurality simulated states associated with the fourth simulated object 212 at various times. For example, the simulated perception data 140 can be indicative of a first location 214 of the fourth simulated object 212 at a first time (e.g., "$t_1$"). The simulated perception data 140 can be indicative of a second location 215 of the fourth simulated object 212 at a second time (e.g., "$t_2$"), and so forth. In some implementations, the simulated perception data 140 can be indicative of the speed at which the fourth object 212 is to travel. In this way, the simulated perception data 140 can define the movement of the fourth simulated object 212 within the surrounding environment 200 of the vehicle 104.

In another example, the simulated perception data 140 can be indicative of a fifth simulated object 215 (e.g., a jaywalking pedestrian) within the surrounding environment 200 of the vehicle 104. FIG. 2 illustrates various simulates states of the fifth simulated object 216 over time. The simulated perception data 140 can be configured such that fifth simulated object 216 is programmed to move across a travel way when the vehicle 104 arrives at a certain location within the surrounding environment 200 and/or within a certain threshold distance from the fifth simulated object 216. In some implementations, the simulated perception data 140 can define a plurality of waypoints (and/or a trajectory) along which the fifth simulated object 216 is to travel. In some implementations, simulated perception data 140 can define a single waypoint to which the fifth simulated object 216 is to travel and the fifth simulated object 216 can be programmed to travel to that location without a defined trajectory.

The simulated perception data 140 can be indicative of objects other than simulated vehicles and pedestrians. For example, the simulated perception data 140 can be indicative of a simulated tree 218. In some implementations, the simulated perception data 140 can be indicative of a simulated obstacle 220 within the travel way 202 (e.g., a pothole, roadwork, construction, etc.).

The vehicle computing system 102 can determine a motion of the vehicle 104 based at least in part on the simulated perception data 140. For instance, the vehicle computing system 102 can access the simulated perception data 140 from an accessible memory onboard the vehicle 104. The vehicle computing system 102 can utilize the simulated perception data 140, as it would real perception data 130, to help autonomously operate the vehicle 104. For instance, the vehicle computing system 102 (e.g., the prediction system 126) can generate prediction data 132 based at least in part on the simulated perception data 140. The vehicle computing system 102 can determine one or more predicted future locations of at least one simulated object within the surrounding environment 200 of the vehicle 104 based at least in part on the simulated perception data 140 (e.g., the one or more simulated states of the at least one simulated object). By way of example, the vehicle computing system 102 can determine one or more predicted future locations 222 of the fourth simulated object 212 (e.g., across the crosswalk to the other side of the travel way). The predicted future locations 222 can make up a predicted trajectory of the fourth simulated object 212. In another example, the vehicle computing system 102 can determine one or more predicted future locations 224 of the fifth simulated object 216 (e.g., jaywalking to the other side of the travel way). The predicted future locations 224 can make up a predicted trajectory of the fifth simulated object 216.

The vehicle computing system 104 can plan the motion of the vehicle 104 based at least in part on the simulated perception data 140. For instance, the vehicle computing system 102 can determine a motion plan 134 for the vehicle 104 based at least in part on the one or more predicted future locations (e.g., 222, 224) of the at least one simulated object (e.g., 212, 216) within the surrounding environment 200 of the vehicle 104. This can include, for example, the one or more predicted future locations 222 of the fourth simulated object 212 and/or the one or more predicted future locations 224 of the fifth simulated object 216. The vehicle computing system 102 can also, or alternatively, determine a motion plan 134 for the vehicle 104 based at least in part on simulated states (e.g., locations, orientations, classifications, etc.) indicated in the simulated perception data 140. For example, the motion plan 134 can be based at least in part on the location(s) of static simulated objects as indicated in the simulated perception data 140.

The vehicle computing system 102 can cause the vehicle 104 to travel in accordance with the determined motion of the vehicle 104 through the surrounding environment 200 of the vehicle 104. For instance, the vehicle computing system 102 can cause the vehicle 104 to travel in accordance with the motion plan 134 through the surrounding environment 200 of the vehicle 104. The motion plan 134 can include one or more vehicle motion actions (e.g., speed adjustments, heading adjustments, acceleration adjustments, stops, etc.). The motion plan 134 can also include one or more vehicle trajectories 226 along which the vehicle 104 is to travel. The vehicle computing system 102 (e.g., the motion planning system 128) can provide the motion plan 134 with data indicative of the vehicle actions, one or more vehicle trajectories 226, and/or other operating parameters to the vehicle control system(s) 116 to implement the motion plan 134 for the vehicle 104. In response the vehicle control system(s) 116 can control the motion of the vehicle 104 in accordance with the motion plan 134 (e.g., so that the vehicle 104 travels along the one or more vehicle trajectories 226).

During and/or after testing (that implements the simulated perception data 140), the vehicle computing system 102 can provide feedback data associated with the vehicle's operations and functions. For example, as shown in FIG. 1, the vehicle computing system 102 can provide feedback data 150 associated with the vehicle 104 (within the surrounding environment 200), to one or more remote computing devices such as, for example, the computing device(s) of the simulation computing system 106 and/or another system. The feedback data 150 can be descriptive of the operations and functions of the systems onboard the vehicle 104. This can include, for example, the sensor(s) 112, the autonomy computing system 114, the perception system 124, the prediction system 126, the motion planning system 128, the vehicle control system(s) 116, and/or any other system of the vehicle 104.

Figure 3:
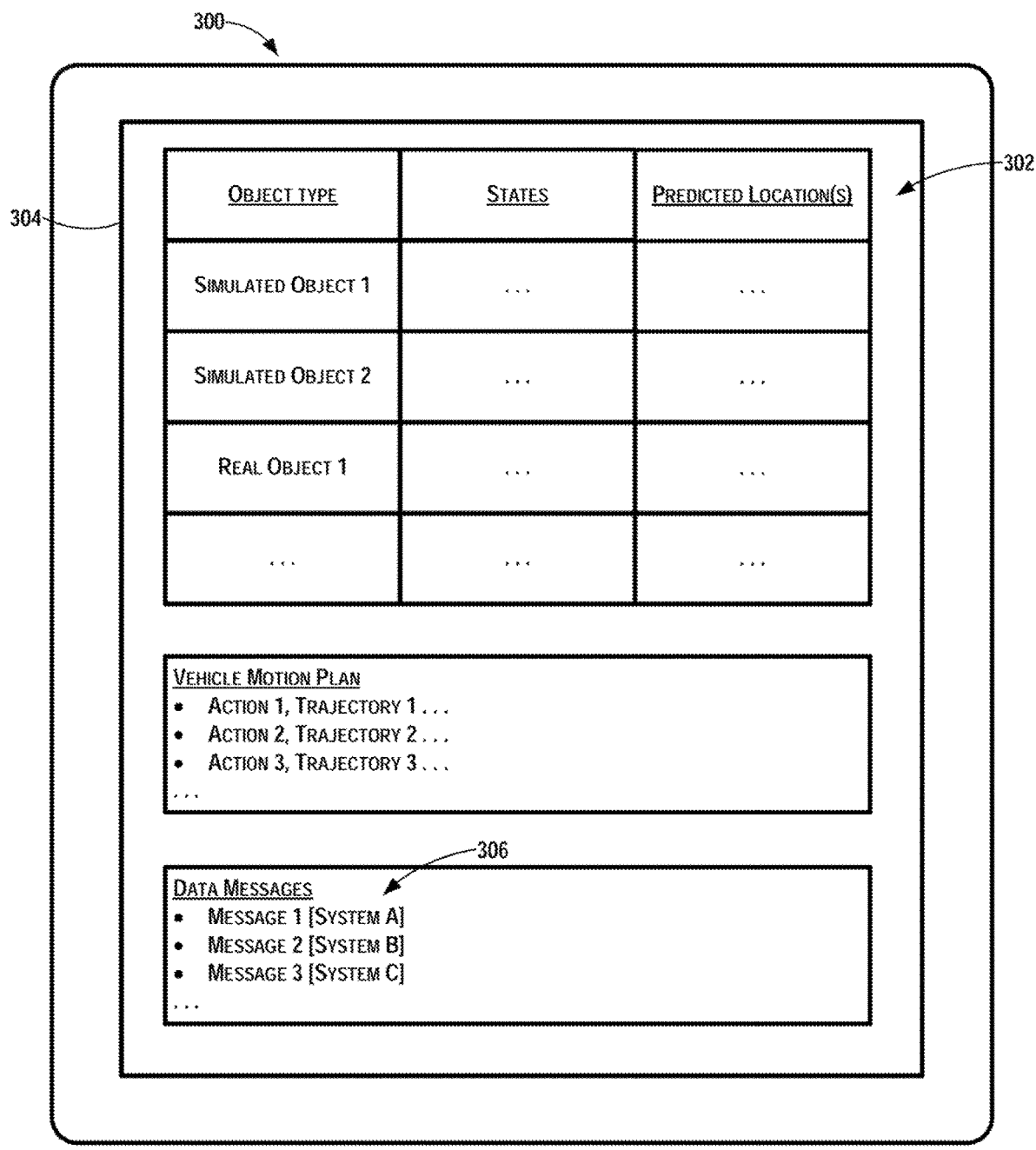
FIG. 3 depicts example feedback data according to example embodiments of the present disclosure.

The feedback data 150 can be indicative of a variety of information associated with the vehicle 104 and/or the surrounding environment 200 (e.g., a testing environment). For example, FIG. 3 depicts a display device 300 with example feedback data 302 according to example embodiments of the present disclosure. The feedback data 302 can be presented by a user interface 304 display via the display device 300 (e.g., screen). The display device 300 can be associated with the simulation computing system 106 (e.g., of a laptop). The feedback data 302 can include information associated with the autonomous operations of the vehicle 104 as it operations within the surrounding environment 200 and/or data generated/obtained by the vehicle computing system 102 (and its component systems). For example, the feedback data 302 can be indicative of the object(s) (e.g., real or simulated) that were perceived by the vehicle computing system 102. The feedback data 302 can be indicative of the states (e.g., real or simulated) of the object(s) (e.g., real or simulated) within the surrounding environment 200. The feedback data 302 can be indicative of the one or more predicted future locations of an object (e.g., real or simulated) and/or whether the object was static or in motion. In some implementations, the feedback data 302 can be indicative of data associated with the determined motion plan 134. For example, the feedback data 302 can be indicative of the planned vehicle action(s), one or more vehicle trajectories 226, the location(s) the vehicle 104 travelled, the travel ways on which the vehicle 104 travelled, times associated with object perception/object motion/vehicle actions, etc. In some implementations, the feedback data 302 can also be indicative of one or more data messages 306 associated with the systems onboard the vehicle 104. The data messages 306 can include data messages exchanged, provided, obtained, etc. by the various systems onboard the vehicle 104. Additionally, or alternatively, the data messages 306 can include error messages, processing messages, troubleshooting messages, and/or other types of messages. A testing coordinator can review the feedback data 302 via the user interface 304.

In some implementations, the simulation computing system 106 (and/or other remote computing device(s) that are remote from the vehicle 104) can perform an evaluation and/or performance analysis associated with the vehicle 104 based at least in part on the feedback data 302. In some implementations, an evaluation/analysis can be performed onboard the vehicle 104 by the vehicle computing system 102. The evaluation and/or performance analysis can, for example, compare the operations of the vehicle's systems within the surrounding environment 200 (e.g., as indicated by the feedback data) to a set of predetermined performance metrics. The predetermined performance metrics can be generated by a computing system (e.g., the simulation computing system 106) based at least in part on simulated perception data 140 and/or algorithms similar to those that run on the vehicle 104 when the vehicle 104 is deployed in the surrounding environment. The predetermined performance metrics can be indicative of the ideal performance of each respective system given the configuration of the surrounding environment 200, the associated objects (e.g., real or simulated), and/or other testing conditions. In this way, the performance of the vehicle 104 (e.g., its autonomy computing system 114, new software, new hardware, etc.) can be evaluated, re-configured, and/or re-tested, if necessary.

In some implementations, the vehicle computing system 102 can implement a combination of simulated perception data 140 and real perception data 130. Returning to FIG. 2, the surrounding environment 200 (e.g., the testing environment) can include one or more real objects 230-236. For example, a first real object 230 (e.g., a real human pedestrian), a second real object 232 (e.g., real shrubbery), a third real object 234 (e.g., a real tree), and/or a fourth real object 236 (e.g., a real parked vehicle) can be located within the surrounding environment 200. As shown in FIG. 2, the real objects 230-236 can be located on one side of a travel way 248. These real objects can be placed within the surrounding environment 200. The real objects can be static (e.g., a parked vehicle) or can be configured to move (e.g., a walking pedestrian). The perception system 124 of the vehicle 104 can be enabled (at least partially) to process sensor data 118 indicative of the real objects 230-236 in order to perceive these real objects 230-236 within the surrounding environment 200 (e.g., the testing environment) and obtain real perception data 130 indicative of the state(s) of the real objects 230-236, in a manner similar to that described herein.

The vehicle computing system 102 can also implement simulated perception data 140 indicative of one or more simulated objects 240-244 to supplement the real perception data 130 within the surrounding environment 200. By way of example, the surrounding environment 200 can include a travel way 248 (e.g., road) on which the vehicle 104 may travel. The test coordinators can position the fourth real object 236 (e.g., the real parked vehicle) as well as the other real objects 230-234 on one side of the travel way 248. Additionally, the vehicle computing system 102 can obtain simulated perception data 140 that is indicative of a plurality of simulated objects 240-244 (e.g., simulated vehicles) travelling on the other side of the travel way 248 to simulate oncoming traffic in an adjacent travel lane of the travel way 248. The vehicle computing system 102 can perceive the real objects 230-236 based at least in part on sensor data 118 and the perception system 124. The vehicle computing system 102 can utilize the simulated perception data 140 to perceive the simulated objects 240-244 (e.g., the simulated oncoming traffic). The vehicle computing system 102 can plan the motion of the vehicle 104 to avoid the real objects 230-236 (e.g., the real parked vehicle, real pedestrian, real shrubbery, real tree, etc.), without traveling into the adjacent travel lane that has the simulated oncoming traffic. In this way, the simulated perception data 140 can supplement the real conditions within the surrounding environment 200 with simulated testing conditions, saving time and costs associated with setting up more real objects within the surrounding environment 200.

Figure 4A:
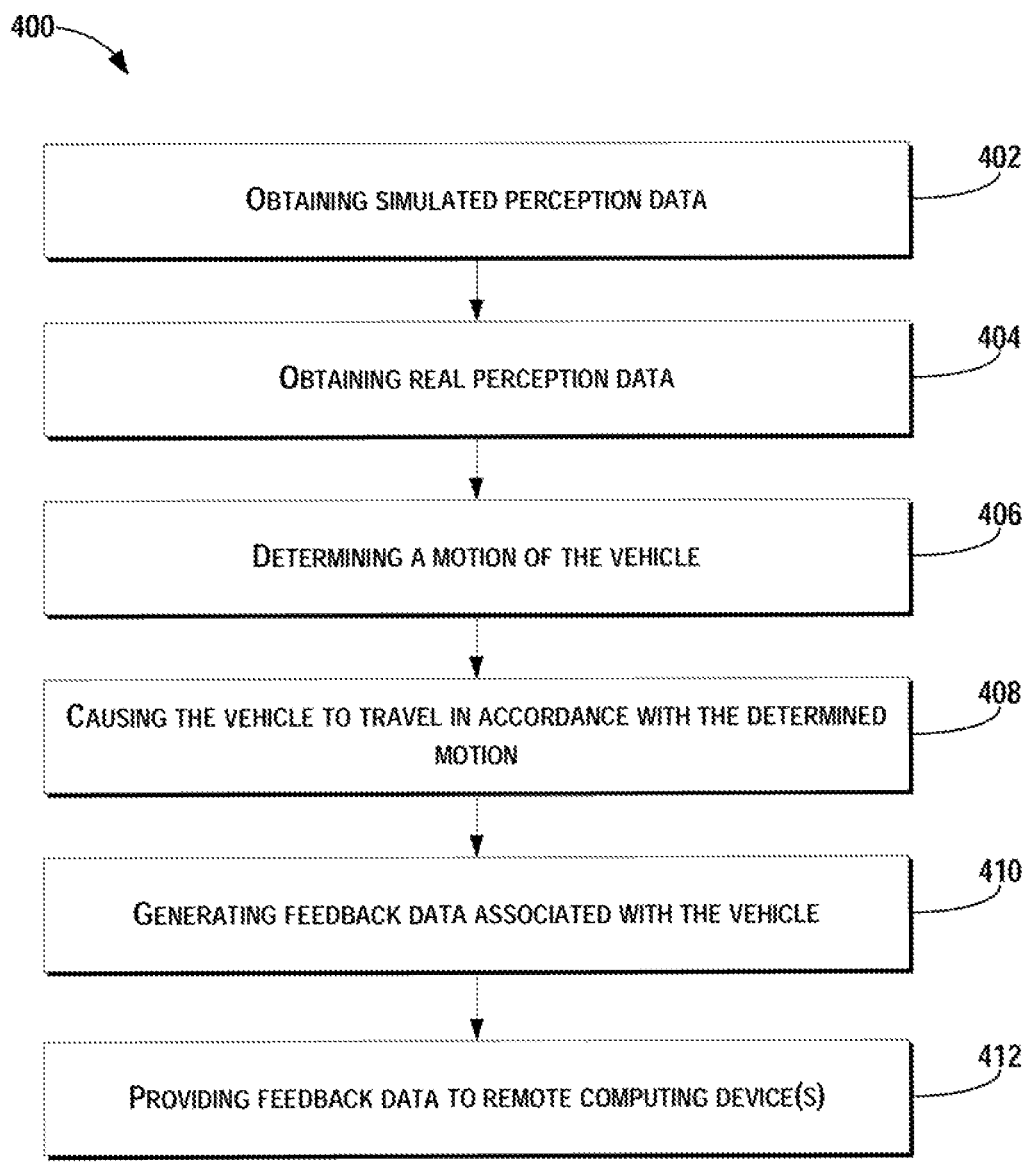
FIG. 4A depicts a flow diagram of an example method of autonomous vehicle testing according to example embodiments of the present disclosure.

FIG. 4A depicts a flow diagram of an example method 400 for autonomous vehicle testing according to example embodiments of the present disclosure. One or more portion(s) of the method 400 can be implemented by one or more computing devices such as, for example, the one or more computing device(s) of the vehicle computing system 102. Each respective portion of the method 400 can be performed by any (or any combination) of the one or more computing devices. Moreover, one or more portion(s) of the method 400 can be implemented as an algorithm on the hardware components of the device(s) described herein (e.g., as in FIGS. 1 and 5), for example, to implement autonomous vehicle testing and control an autonomous vehicle (e.g., with regard to simulated perception data). FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (402), the method 400 can include obtaining simulated perception data. For instance, the vehicle computing system 102 can obtain simulated perception data 140 indicative of one or more simulated states of at least one simulated object (e.g., fourth object 212) within a surrounding environment 200 of a vehicle 104 (e.g., an autonomous vehicle). The one or more simulated states of the at least one simulated object (e.g., fourth object 212) can be indicative of one or more locations of the at least one simulated object within the surrounding environment 200 of the vehicle 104 at one or more respective times. Additionally, or alternatively, the one or more simulated states of the at least one simulated object can be indicative of at least one of a classification of the at least one simulated object or a heading of the at least one simulated object. The vehicle computing system 102 can obtain the simulated perception data 140 from one or more remote computing devices (e.g., the simulation computing system 106). The vehicle computing system 102 can store the simulated perception data 140 in an accessible memory onboard the vehicle 104.

In some implementations, the simulated perception data 140 can be used entirely in lieu of real perception data 130. For example, the vehicle 104 can include a perception system 124 configured to perform an operation that includes perceiving the surrounding environment 200 of the vehicle 104 based on sensor data 118 obtained via one or more sensor(s) 112 onboard the vehicle 104, as described herein. The perception system 124 can be disabled from performing the operation (e.g., to prevent the acquisition of real perception data 130).

In some implementations, at (404), the method 400 can include obtaining real perception data. For example, test coordinators may desire to test the sensor(s) 112 and utilize real objects within the testing environment of the vehicle 104. The vehicle computing system 102 can obtain real perception data 130 indicative of one or more states of at least one real object (e.g., fourth real object 236) within the surrounding environment 200 of the vehicle 104. This can be combined with the simulated perception data 140 for autonomous vehicle motion planning.

At (406), the method 400 can include determining a motion of the vehicle. The vehicle computing system 102 can determine a motion of the vehicle 104 based at least in part on the simulated perception data 140. For instance, the vehicle computing system 102 can determine one or more predicted future locations (e.g., predicted future locations 222) of the at least one simulated object (e.g., fourth object 212) within the surrounding environment 200 of the vehicle 104 based at least in part on the simulated perception data 140. The vehicle computing system 102 can determine a motion plan 134 for the vehicle 104 based at least in part on the one or more predicted future locations (e.g., predicted future locations 222) of the at least one simulated object (e.g., fourth object 212) within the surrounding environment 200 of the vehicle 104 and/or the simulated perception data 140.

In some implementations, the vehicle computing system 102 can determine the motion of the vehicle 104 also based at least in part on the real perception data 130. By way of example, at least one real object (e.g., fourth real object 236) within the surrounding environment 200 can be static (e.g., a real parked vehicle). At least one simulated object 240-244 can be configured to move within the surrounding environment 200 of the vehicle 104 (e.g., moving vehicles to simulate oncoming traffic). The vehicle computing system 102 can plan the motion of the vehicle 104 based at least in part on the real object 236 (indicated by the real perception data 130) and the simulated object 240-444 (indicated in the simulated perception data 130), as described herein.

At (408), the method 400 can include causing the vehicle to travel in accordance with the determined motion of the vehicle. The vehicle computing system 102 can cause the vehicle 104 to travel in accordance with the determined motion of the vehicle 104 through the surrounding environment 200 of the vehicle 104. For instance, the vehicle computing system 102 can cause the vehicle 104 to travel in accordance with the motion plan 134 for the vehicle 104. To do so, one or more control signals can be provided to the vehicle control system(s) 116 to implement the motion plan 134 (e.g., to cause the vehicle 104 to travel in accordance with the one or more planned vehicle trajectories, etc.).

At (410), the method 400 can include generating feedback data associated with the vehicle. For instance, the vehicle computing system 102 can generate feedback data 150 associated with the vehicle 104. The feedback data 150 can be specific to individual systems onboard the vehicle 104. For example, the vehicle computing system 102 can generate feedback data 150 associated with the sensors 118, perception system 124, the prediction system 126, the motion planning system 128, etc. The feedback data 150 can include, for example, at least one of one or more predicted future locations of the at least one simulated object or data messages associated with one or more systems onboard the vehicle 104, as described herein. The vehicle computing system 102 can provide, to one or more remote computing devices that are remote from the vehicle 104, the feedback data 150 associated with the vehicle 104, at (412). This can allow for off-board analysis of the vehicle's testing performance.

Figure 4B:
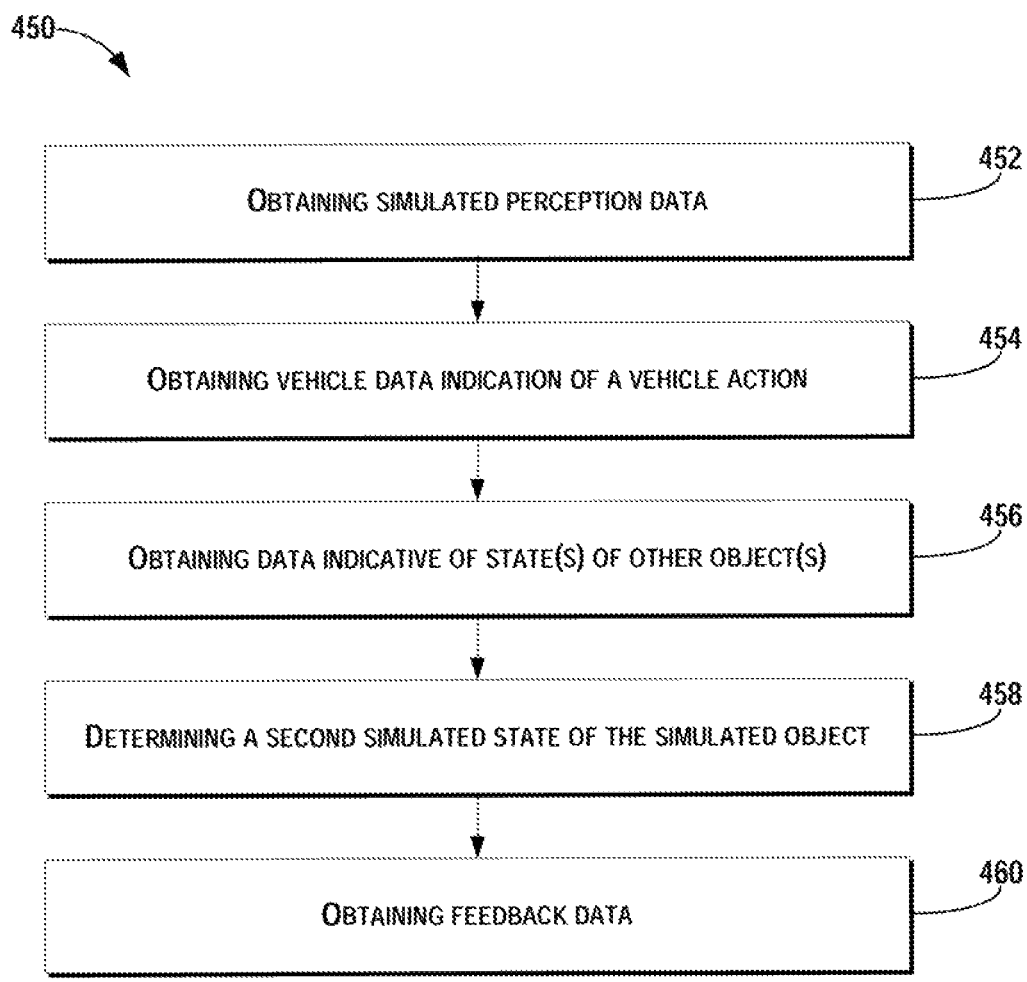
FIG. 4B depicts a flow diagram of an example method of object simulation for autonomous vehicle testing according to example embodiments of the present disclosure.

FIG. 4B depicts a flow diagram of an example method 450 of object simulation for autonomous vehicle testing according to example embodiments of the present disclosure. One or more portion(s) of the method 450 can be implemented by one or more computing devices such as, for example, the one or more computing device(s) of the simulation computing system 106. Each respective portion of the method 450 can be performed by any (or any combination) of the one or more computing devices. Moreover, one or more portion(s) of the method 450 can be implemented as an algorithm on the hardware components of the device(s) described herein (e.g., as in FIGS. 1 and 5), for example, to configure simulated objects.

At (452), the method 450 can include obtaining simulated perception data. The simulation computing system 106 can provide, to a vehicle 104 (e.g., the vehicle computing system 102), simulated perception data 140 indicative of a first simulated state of a simulated object within a surrounding environment 200 of a vehicle 104. The first simulated state can include a location of the simulated object at a first time.

At (454), the method 450 can include obtaining vehicle data indicative of a vehicle action. The simulation computing system 106 can obtain vehicle data 141 from the vehicle 104 indicative of an action to be performed by the vehicle 104. For instance, the vehicle data 141 can include data indicative of a motion plan 134 of the vehicle 104. In some implementations, the simulation computing system 106 can obtain data indicative of a state of another object within the surrounding environment 200 of the vehicle 104, at (456), as described herein.

At (458), the method 450 can include determining a second simulated state of the simulated object. The simulation computing system 106 can determine, based on the vehicle data 141, the second simulated state of the simulated object. By way of example, the simulation computing system 106 can determine a second simulated state of the simulated object in a manner that reflects a level of reactivity of the simulated object with respect to the vehicle 104 (e.g., careful, careless, etc.). This can allow the simulation computing system 106 to test the vehicle 104 and its ability to account for various types of simulated objects (e.g., careful pedestrians, careless drivers, etc.). In some implementations, the simulation computing system 106 can determine, based also on the data indicative of the state of the other object, the second simulated state of the simulated object. The simulation computing system 106 can determine a second simulated state of the simulated object in a manner that reflects a level of reactivity of the simulated object with respect to the other object (e.g., careful, careless, etc.). In a manner similar to that described herein with respect to method 400, at (460), the simulation computing system 106 can obtain feedback data associated with vehicle 104 (e.g., indicative of the vehicle's actions associated with the reactive simulated object).

Figure 5:
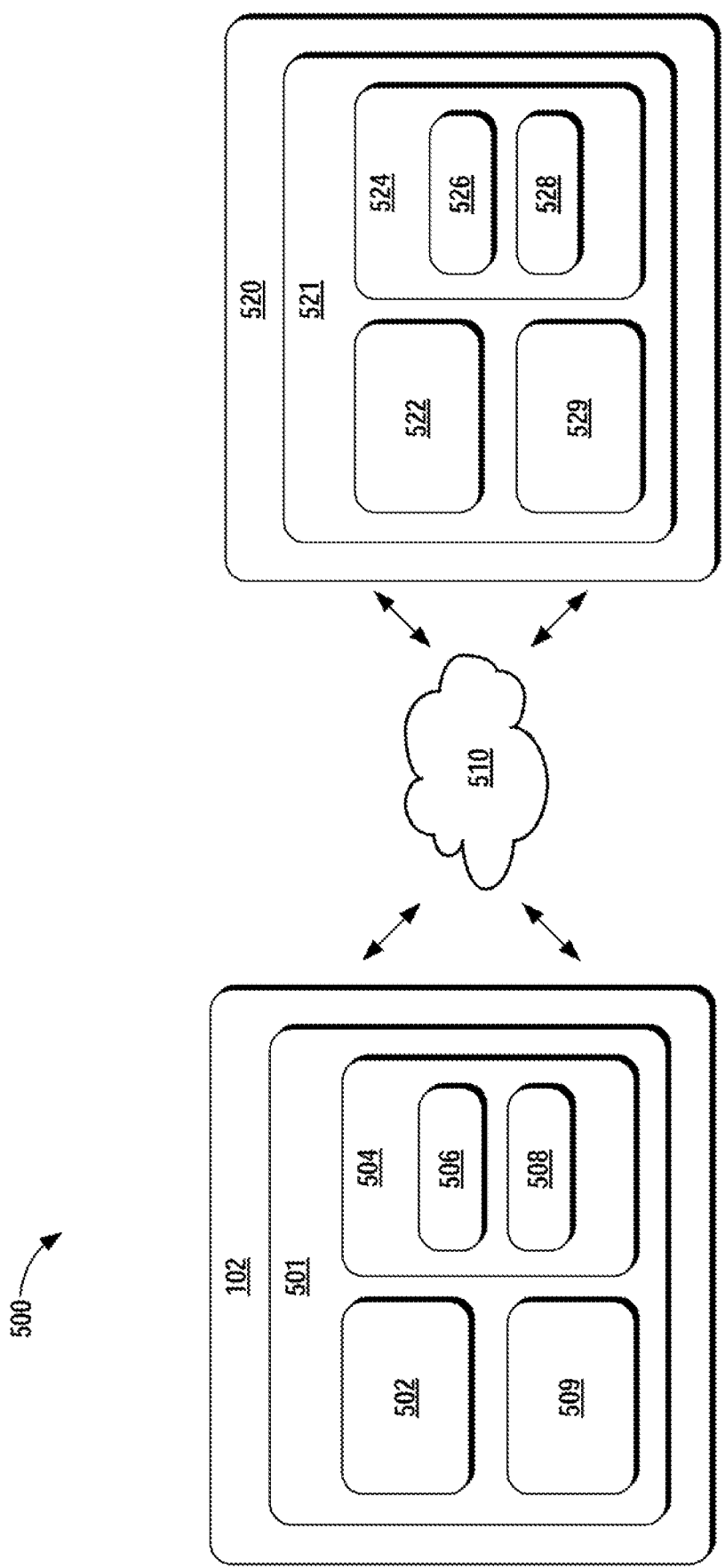
FIG. 5 depicts example system components according to example embodiments of the present disclosure.

FIG. 5 depicts an example system 500 according to example embodiments of the present disclosure. The example system 500 illustrated in FIG. 5 is provided as an example only. The components, systems, connections, and/or other aspects illustrated in FIG. 5 are optional and are provided as examples of what is possible, but not required, to implement the present disclosure. The example system 500 can include the vehicle computing system 102 of the vehicle 104 and a remote computing system 520 that can be communicatively coupled to one another over one or more network(s) 510. The remote computing system 520 can be the simulation computing system 106. The remote computing system 520 can be associated with an entity associated with the vehicle 104 such as, for example, a vehicle test facility, owner, vehicle manager, fleet operator, service provider, etc.

The computing device(s) 501 of the vehicle computing system 102 can include processor(s) 502 and a memory 504. The one or more processors 502 can be any suitable processing device (e.g., a processor core, a microprocessor, an ASIC, a FPGA, a controller, a microcontroller, etc.) and can be one processor or a plurality of processors that are operatively connected. The memory 504 can include one or more non-transitory computer-readable storage media, such as RAM, ROM, EEPROM, EPROM, one or more memory devices, flash memory devices, data registrar, etc., and combinations thereof.

The memory 504 can store information that can be accessed by the one or more processors 502. For instance, the memory 504 (e.g., one or more non-transitory computer-readable storage mediums, memory devices) on-board the vehicle 104 can include computer-readable instructions 506 that can be executed by the one or more processors 502. The instructions 506 can be software written in any suitable programming language or can be implemented in hardware. Additionally, or alternatively, the instructions 506 can be executed in logically and/or virtually separate threads on processor(s) 502.

For example, the memory 504 on-board the vehicle 104 can store instructions 506 that when executed by the one or more processors 502 on-board the vehicle 104 cause the one or more processors 502 (the vehicle computing system 102) to perform operations such as any of the operations and functions of the vehicle computing system 102, the operations for implementing simulated perception data, the operations for autonomous vehicle testing (e.g., one or more portions of method 400), any of the operations and functions for which the vehicle computing system 102 is configured, and/or any other operations and functions of the vehicle computing system 102, as described herein.

The memory 504 can store data 508 that can be obtained, received, accessed, written, manipulated, created, and/or stored. The data 508 can include, for instance, simulated perception data, real perception data, prediction data, motion planning data, feedback data, and/or other data/information as described herein. In some implementations, the computing device(s) 501 can obtain data from one or more memories that are remote from the vehicle 104.

The computing device(s) 501 can also include a communication interface 509 used to communicate with one or more other system(s) on-board the vehicle 104 and/or a remote computing device that is remote from the vehicle 104 (e.g., of the simulation computing system 106). The communication interface 509 can include any circuits, components, software, etc. for communicating via one or more networks (e.g., network(s) 510). In some implementations, the communication interface 509 can include, for example, one or more of a communications controller, receiver, transceiver, transmitter, port, conductors, software and/or hardware for communicating data.

The remote computing system 520 can include one or more computing device(s) 521 that are remote from the vehicle computing system 102. The computing device(s) 521 can include one or more processors 522 and a memory 524. The one or more processors 522 can be any suitable processing device (e.g., a processor core, a microprocessor, an ASIC, a FPGA, a controller, a microcontroller, etc.) and can be one processor or a plurality of processors that are operatively connected. The memory 524 can include one or more tangible, non-transitory computer-readable storage media, such as RAM, ROM, EEPROM, EPROM, one or more memory devices, flash memory devices, data registrar, etc., and combinations thereof.

The memory 524 can store information that can be accessed by the one or more processors 522. For instance, the memory 524 (e.g., one or more tangible, non-transitory computer-readable storage media, one or more memory devices, etc.) can include computer-readable instructions 526 that can be executed by the one or more processors 522. The instructions 526 can be software written in any suitable programming language or can be implemented in hardware. Additionally, or alternatively, the instructions 526 can be executed in logically and/or virtually separate threads on processor(s) 522.

For example, the memory 524 can store instructions 526 that when executed by the one or more processors 522 cause the one or more processors 522 to perform operations such as any of the operations and functions of the simulation computing system 106 or for which the simulation computing system 106 is configured, as described herein, operations and functions for generating and providing simulated perception data and/or other data to the vehicle 104, the operations and functions for obtaining and analyzing feedback data, and/or any other operations and functions described herein.

The memory 524 can store data 528 that can be obtained, received, accessed, written, manipulated, created, and/or stored. The data 528 can include, for instance, simulated perception data, logic associated with a simulated object, feedback data, other data associated with a vehicle, and/or other data/information as described herein. In some implementations, the computing device(s) 521 can obtain data from one or more memories that are remote from the remote computing system 520 and/or are onboard the vehicle 104.

The computing device(s) 521 can also include a communication interface 529 used to communicate with one or more system(s) onboard the vehicle 104 and/or another computing device that is remote from the simulation computing system 106. The communication interface 529 can include any circuits, components, software, etc. for communicating via one or more networks (e.g., network(s) 510). In some implementations, the communication interface 529 can include, for example, one or more of a communications controller, receiver, transceiver, transmitter, port, conductors, software and/or hardware for communicating data.

The network(s) 510 can be any type of network or combination of networks that allows for communication between devices. In some embodiments, the network(s) 510 can include one or more of a local area network, wide area network, the Internet, secure network, cellular network, mesh network, peer-to-peer communication link and/or some combination thereof and can include any number of wired or wireless links. Communication over the network(s) 510 can be accomplished, for instance, via a communication interface using any type of protocol, protection scheme, encoding, format, packaging, etc.

Computing tasks discussed herein as being performed at computing device(s) remote from the vehicle can instead be performed at the vehicle (e.g., via the vehicle computing system), or vice versa. Moreover, computing tasks discussed herein as being performed by the operations computing system can be performed by another computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of autonomous vehicle testing, comprising:
    obtaining, by a computing system comprising one or more computing devices, simulated perception data indicative of one or more simulated states of at least one simulated object within a surrounding environment of an autonomous vehicle,
    wherein the computing system comprises a perception system and a prediction system, and wherein the simulated perception data is obtained via the prediction system and the perception system is disabled, wherein when the perception system is disabled the computing system is prevented from perceiving the surrounding environment based on sensor data;
    determining, by the prediction system of the computing system, one or more predicted future locations of the at least one simulated object within the surrounding environment of the autonomous vehicle based at least in part on the simulated perception data;
    determining, by the computing system, a motion of the autonomous vehicle based at least in part on the one or more predicted future locations of the at least one simulated object within the surrounding environment of the autonomous vehicle; and
    causing, by the computing system, the autonomous vehicle to travel in accordance with the determined motion of the autonomous vehicle through the surrounding environment of the autonomous vehicle.

2. The computer-implemented method of claim 1, wherein determining, by the computing system, the motion of the autonomous vehicle comprises:
    determining, by the computing system, a motion plan for the autonomous vehicle based at least in part on the one or more predicted future locations of the at least one simulated object within the surrounding environment of the autonomous vehicle.

3. The computer-implemented method of claim 2, wherein causing, by the computing system, the autonomous vehicle to travel in accordance with the determined motion of the autonomous vehicle through the surrounding environment of the autonomous vehicle comprises:
    causing, by the computing system, the autonomous vehicle to travel in accordance with the motion plan for the autonomous vehicle.

4. The computer-implemented method of claim 1, wherein the one or more simulated states of the at least one simulated object are indicative of one or more locations of the at least one simulated object within the surrounding environment of the autonomous vehicle at one or more respective times.

5. The computer-implemented method of claim 1, wherein the at least one simulated object is configured to move within the surrounding environment of the autonomous vehicle.

6. The computer-implemented method of claim 1, wherein obtaining the simulated perception data comprises:
    obtaining, by the computing system, the simulated perception data from one or more remote computing devices; and
    storing, by the computing system, the simulated perception data in an accessible memory onboard the autonomous vehicle.

7. The computer-implemented method of claim 1, further comprising:
    providing, by the computing system to one or more remote computing devices that are remote from the autonomous vehicle, feedback data associated with the autonomous vehicle.

8. The computer-implemented method of claim 7, wherein the feedback data comprises at least one of one or more predicted future locations of the at least one simulated object or data messages associated with one or more systems onboard the autonomous vehicle.

9. A computing system for autonomous vehicle testing, comprising:
one or more processors; and
one or more tangible, non-transitory, computer readable media, that collectively store instructions that when executed by the one or more processors cause the computing system to perform operations, the operations comprising:
obtaining simulated perception data indicative of one or more simulated states of at least one simulated object within a surrounding environment of an autonomous vehicle, wherein the computing system comprises a perception system and a prediction system, and wherein the simulated perception data is obtained via the prediction system and the perception system is disabled, wherein when the perception system is disabled the computing system is prevented from perceiving the surrounding environment based on sensor data;
determining one or more predicted future locations of the at least one simulated object within the surrounding environment of the autonomous vehicle based at least in part on the simulated perception data;
determining a motion plan for the autonomous vehicle based at least in part on the one or more predicted future locations of the at least one simulated object within the surrounding environment of the autonomous vehicle; and
causing the autonomous vehicle to travel in accordance with the motion plan through the surrounding environment of the autonomous vehicle.

10. The computing system of claim 9, wherein the surrounding environment of the autonomous vehicle is a testing environment.

11. The computing system of claim 10, wherein the operations further comprise:
providing, to one or more remote computing devices that are remote from the autonomous vehicle, feedback data associated with the autonomous vehicle within the testing environment.

12. The computing system of claim 9, wherein the one or more simulated states of the at least one simulated object are indicative of one or more locations of the at least one simulated object within the surrounding environment of the autonomous vehicle at one or more respective times.

13. The computing system of claim 9, wherein the one or more simulated states of the at least one simulated object are indicative of at least one of a classification of the at least one simulated object or a heading of the at least one simulated object.

14. The computing system of claim 9, wherein the simulated perception data indicates that the at least one simulated object is configured to be reactive to the motion of the autonomous vehicle.

15. A computer-implemented method comprising:
providing, by a computing system comprising one or more computing devices to an autonomous vehicle, simulated perception data indicative of a first simulated state of a simulated object within a surrounding environment of an autonomous vehicle,
wherein the autonomous vehicle comprises a perception system and a prediction system, and wherein the simulated perception data is obtained via the prediction system and the perception system is disabled, wherein when the perception system is disabled the computing system is prevented from perceiving the surrounding environment based on sensor data;
obtaining, by the computing system, vehicle data from the autonomous vehicle indicative of an action to be performed by the autonomous vehicle; and
determining, by the computing system based on the vehicle data, a second simulated state of the simulated object.

16. The computer-implemented method of claim 15, wherein the vehicle data comprises data indicative of a motion plan of the autonomous vehicle.

17. The computer-implemented method of claim 16, wherein the determining, by the computing system based on the vehicle data, the second simulated state of the simulated object comprises:
determining, by the computing system, the second simulated state of the simulated object to avoid an intersection with the motion plan of the autonomous vehicle.

18. The computer-implemented method of claim 15, further comprising:
obtaining, by the computing system, data indicative of a state of another object within the surrounding environment; and
determining, by the computing system based on the data indicative of the state of the other object, the second simulated state of the simulated object.

19. The computer-implemented method of claim 1, wherein the one or more simulated states of the at least one simulated object comprises at least one first simulated state, and wherein determining the motion of the autonomous vehicle comprises:
determining, by the computing system, a first motion plan for the autonomous vehicle based at least in part on the one or more predicted future locations of the at least one simulated object within the surrounding environment of the autonomous vehicle;
obtaining, by the computing system, adjusted simulated perception data indicative of at least one second simulated state of the at least one simulated object, wherein the at least one second simulated state of the at least one simulated object is different from the at least one first simulated state and based, at least in part, on the first motion plan for the autonomous vehicle; and
determining, by the computing system, the motion of the autonomous vehicle based at least in part on the at least one second simulated state of the at least one simulated object.

* * * * *